United States Patent [19]
Tourtellot et al.

[11] 3,848,146
[45] Nov. 12, 1974

[54] AC MOTOR

[75] Inventors: John Allen Tourtellot, Indianapolis; Frederick Roland Stave, Oaklandon, both of Ind.

[73] Assignee: RCA Corporation, New York, N.Y.

[22] Filed: Aug. 6, 1973

[21] Appl. No.: 385,667

Related U.S. Application Data

[63] Continuation of Ser. No. 240,037, March 31, 1972, abandoned.

[52] U.S. Cl. .................................. 310/163, 310/193
[51] Int. Cl. ............................................ H02k 19/14
[58] Field of Search ............................ 310/190–193, 310/183, , 211, 162–164, 265, 166

[56] References Cited
UNITED STATES PATENTS

| | | | |
|---|---|---|---|
| 2,435,911 | 2/1948 | Van der Woude | 310/163 |
| 2,442,626 | 6/1948 | Tolson et al. | 310/163 |
| 3,521,098 | 7/1970 | Jesse | 310/163 |

FOREIGN PATENTS OR APPLICATIONS

| | | |
|---|---|---|
| 280,858 | 11/1928 | Great Britain |

*Primary Examiner*—Donovan F. Duggan
*Attorney, Agent, or Firm*—E. M. Whitacre; J. B. Hayes; W. H. Meagher

[57] ABSTRACT

A synchronous motor includes a generally cylindrical rotor rotatably mounted between the poles of a stator. A stator winding is wound on the stator and is energized by an alternating potential to produce a rotating magnetic field between the stator poles. The rotor has a first portion having salient poles to provide synchronous operation of the motor, and a second cylindrical section for establishing a sufficient self-starting torque regardless of the initial position of the rotor with respect to the stator.

3 Claims, 5 Drawing Figures

AC MOTOR

This is a continuation of application Ser. No. 240,037, filed Mar. 31, 1972, now abondoned.

The present invention relates to AC motors and more particularly to synchronous type AC motors.

Induction motors of the type used in phonograph record players include a rotor rotatably mounted between the poles of a stator. The rotor normally is a cylindrically shaped member formed from a lamination of washer or ring-like elements. Each of the rotor laminations has a plurality of concentrically disposed openings. The rotor laminations are positioned with adjacent openings in registration to provide a continuous path for conductors which run through the openings and are connected at opposite ends of the rotor to conductive end members. The conductive end members connect the plurality of rotor conductors in parallel.

A stator winding, energized by a source of AC potential, is wound on the stator. Auxiliary windings called shading coils are also wound on the stator. When the stator winding is energized, a flux field is set up which passes through the rotor and induces currents in the parallel connected conductors which, likewise, establishes a rotor field. The shading coils delay a portion of the stator flux field passing through the rotor. Because the potential applied to the stator windings alternates, the stator field revolves, causing the rotor to rotate as the stator and rotor fields interact.

Motors of the above-described type are non-synchronous in that the rotor field does not occur synchronously with the stator field and there is a slip speed between the two fields. Nevertheless, motors of the above-described type have been made synchronous by the use of either permanent magnets or salient poles.

When synchronization of the motor is achieved with permanent magnets, the magnets are mounted at one or both ends of the rotor. When the rotor begins to approach the synchronous speed, the fields from the permanent magnets lock onto the stator main flux field. As the flux field changes its direction, the magnets snap around to change their position and that of the rotor. Thus, the rotor stays in synchronism with the stator main flux field. The permanent magnets technique for synchronization of the motor, however, is quite costly due to the cost of the permanent magnets and the need to align and balance the magnets on the rotor for proper operation.

To avoid the cost involved with permanent magnet type synchronization, some prior art induction type motors have been made synchronous by means of salient poles on the rotor. Effective north and south poles (salient poles) are formed in the rotor during operation by modifying the generally cylindrically shaped rotor to have non-circular portions, often called flats. While the flats may be flat surfaces, they are usually curved surfaces on the outer surface of the rotor which have a different, often variable radius from that of the rotor itself. The flats are generally machined into the rotor after the rotor laminants are assembled. The flats serve the same purpose and function in the same manner as the permanent magnets.

The flats in the rotor outer surface can create a motor starting problem. A rotor position exists with respect to the shading coils where a large air gap occurs. In this position a reduced delayed flux field passes through the rotor which may not be of sufficient strength to start the motor.

Prior attempts to solve the starting problem have involved skewing the flats to minimize the air gap between the rotor and the stator. The skewing may be achieved by slowly rotating the rotor while the flats are formed, or by first forming the flats and thereafter displacing adjacent rotor laminations. In the latter case, each of the rotor laminations is rotated slightly so that adjacent rotor lamination openings are not in exact registration. Nevertheless, the adjacent rotor lamination openings must retain a sufficient registration to provide clearance for the rotor conductors to pass through the stack of laminations. This technique not only tends to diminish synchronous motor operation, but is costly because of the additional complex manufacturing steps involved.

A synchronous motor embodying the present invention includes a stator having a pair of poles. Means produce a rotating magnetic field between the poles. A generally cylindrical rotor assembly is rotatably mounted between the stator poles. The rotor assembly includes a first portion having salient poles to provide synchronous operation of the motor, and a second cylindrical section for establishing a sufficient self-starting torque regardless of the initial position of the rotor with respect to the stator.

A complete understanding of the present invention may be obtained from the following detailed description of a specific embodiment thereof when taken in conjunction with the accompanying drawings, in which.

Figure 1:
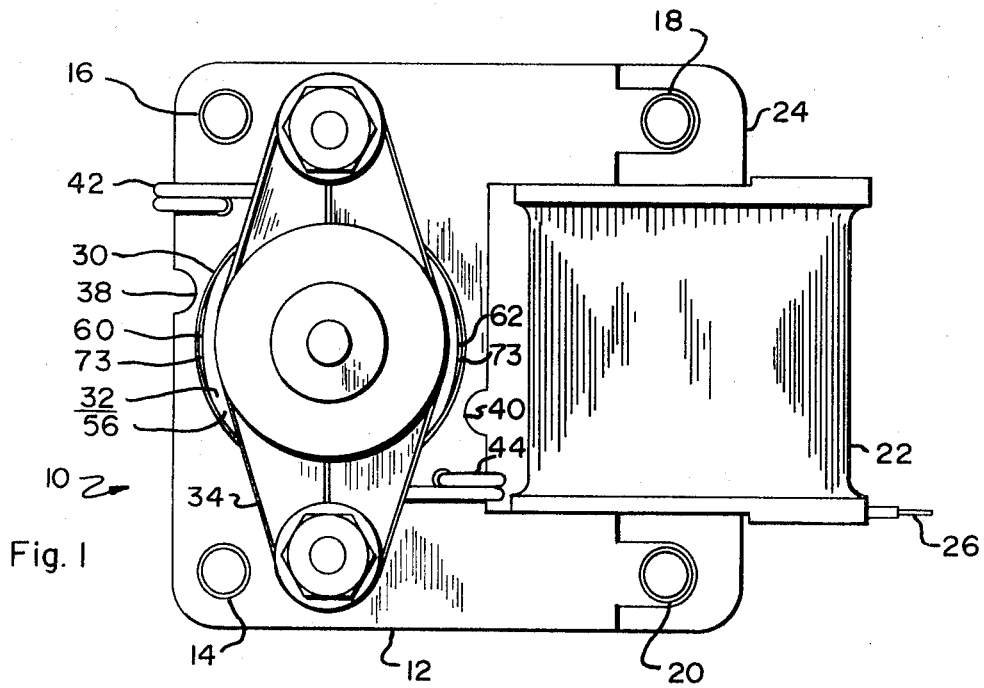
FIG. 1 is a top plan view of a two pole shaded pole synchronous motor embodying the present invention.
Figure 2:
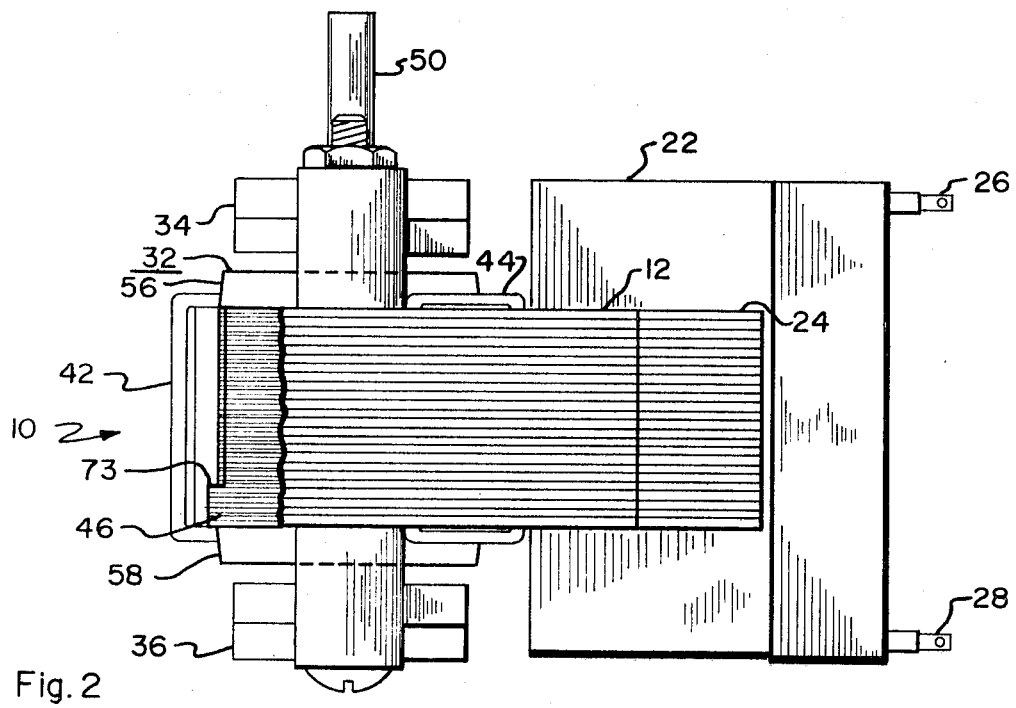
FIG. 2 is a side view, partially broken away, of the motor shown in FIG. 1.

Referring to the drawings, wherein like reference numerals designate similar elements in the various views, a two pole shaded pole induction motor 10 is shown, a type commonly used in driving phonograph turntables. The stator 12 is formed from a stack of rectangular laminations, stamped from sheets of magnetic iron or other appropriate material and held together by rivets 14, 16, 18 and 20 (shown only in FIGS. 1 and 5). A stator winding 22 is wound on one leg 24 of the stator 12. The stator winding has two terminals 26 and 28 which are adapted to be connected to a source of alternating potential, as for example, a 60 Hz 110 volt AC supply.

The stator 12 has a substantially circular opening 30 for receiving a substantially cylindrical squirrel-cage rotor assembly 32. The rotor 32 is mounted for rotation between two bearing assemblies 34 and 36 which are secured to the stator 12. The stator core 12 has two grooves 38 and 40 on opposite sides of the rotor opening 30 increasing the reluctance of the magnetic paths around the sides of the rotor assembly 32 to thereby form a pair of stator poles on opposite sides of the rotor. Two shading coils 42 and 44 are mounted on the stator 12. Each of the shading coils 42 and 44 consists of two separate conductors mounted to each pass as a single turn through the stator 12.

Figure 3:
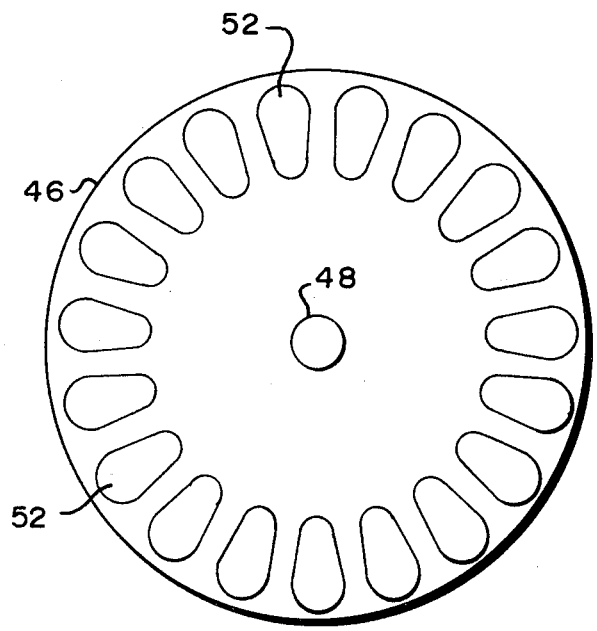
FIG. 3 is an enlarged top plan view of a rotor lamination suitable for use with the motor shown in FIGS. 1–2.
Figure 4:
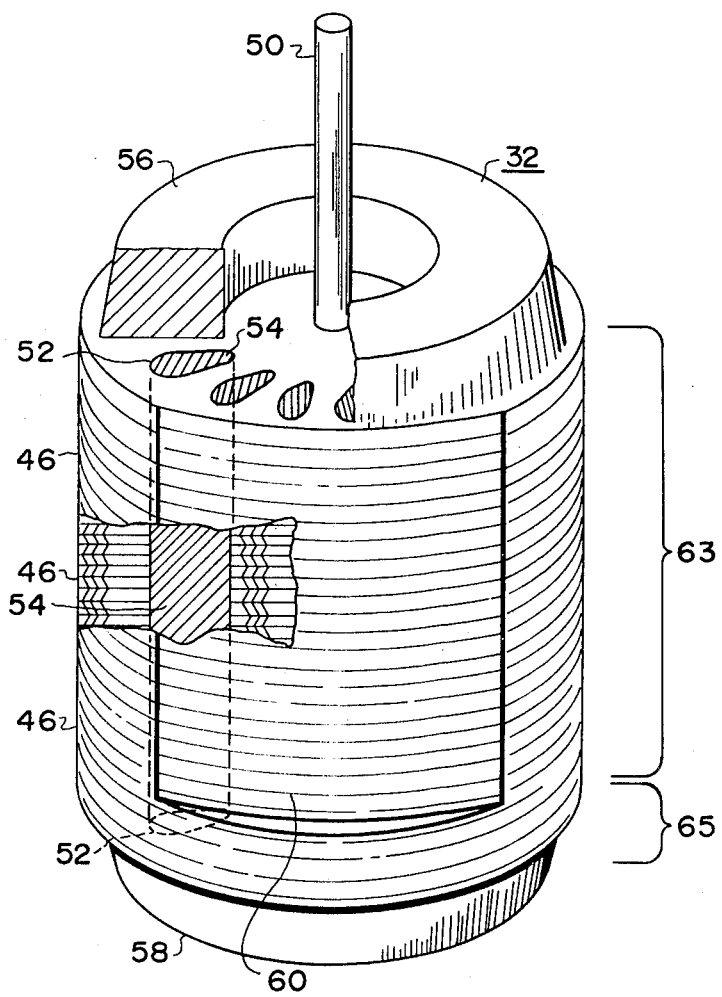
FIG. 4 is an enlarged perspective view, partially broken away, of the motor rotor shown in FIGS. 1–2.

The rotor assembly 32 includes a lamination of ring or washer-like elements 46. As is most clearly shown in FIG. 3, the washer-like elements 46 have a central opening 48 to permit passage of the motor shaft 50. Each of the elements 46 has a plurality of concentrically disposed tear-shaped openings 52. As is best shown in FIG. 4, the rotor laminations 46 are each positioned so that the openings 52 of adjacent elements 46 are in exact registration to provide a continuous path for conductors 54 to run through the opening. Each of the plurality of conductors 54 is electrically connected to conductive rotor end members 56 and 58. The conductive rotor end members connect the plurality of rotor conductors 54 in parallel to form a squirrel-cage type rotor assembly. The rotor conductors 54 and the rotor conductive end members 56 and 58 are formed from molten aluminum cast while the rotor assembly 32 is held in a casting jig. Thereafter, the rotor laminations are press fit onto the motor shaft 50.

As is most clearly shown in FIG. 1, two flats 60 and 62 are formed on opposite sides of the rotor assembly 32. The flats are formed by machining a first portion 63 of the rotor so that a group of washer-like elements 46 near the conductive end member 32 have a pair of surfaces which are not concentric with the motor shaft 50. The flats 60 and 62 are formed in the rotor washer-like elements 46 such that a second portion 65 of the rotor is left unaffected. Thus, a group of washer-like elements 46 near the end member 58 remain concentric with the motor shaft 50, the axis of rotation for the rotor, and a lip 73 is formed between the two rotor portions 63 and 65.

The rotor portion 65 includes a cylindrical section (the group of concentric elements 46) which provides a motor starting band. The axial length of the rotor portion 63 is approximately nine times the axial length of the rotor portion 65. Although the starting band can be located anywhere along the axial length of the rotor assembly 32, disposing the band near the rotor conductive end portion 58 allows the flats 60 and 62 to be machined in one simple operation.

In operation, the stator winding 22 is energized by a source of alternating potential. An alternating flux field is established in the stator 12 which passes through the rotor assembly 32. The shading coils 42 and 44 delay a portion of the stator flux field passing through the rotor.

The alternating flux field passing through the rotor induces currents in the parallel connected rotor conductors 54 which establishes a rotor flux field. The stator and rotor fields interact causing the rotor assembly 32 to rotate. The flats 60 and 62 formed in the rotor portion 63 set up effective north and south poles referred to as salient poles during operation. As the rotor begins to approach its operating synchronous speed, the fields from the salient poles lock onto the stator main flux field. As the stator flux field changes its direction, the rotor salient poles cause a force which tends to snap the rotor around, providing synchronous motor operation.

Figure 5:
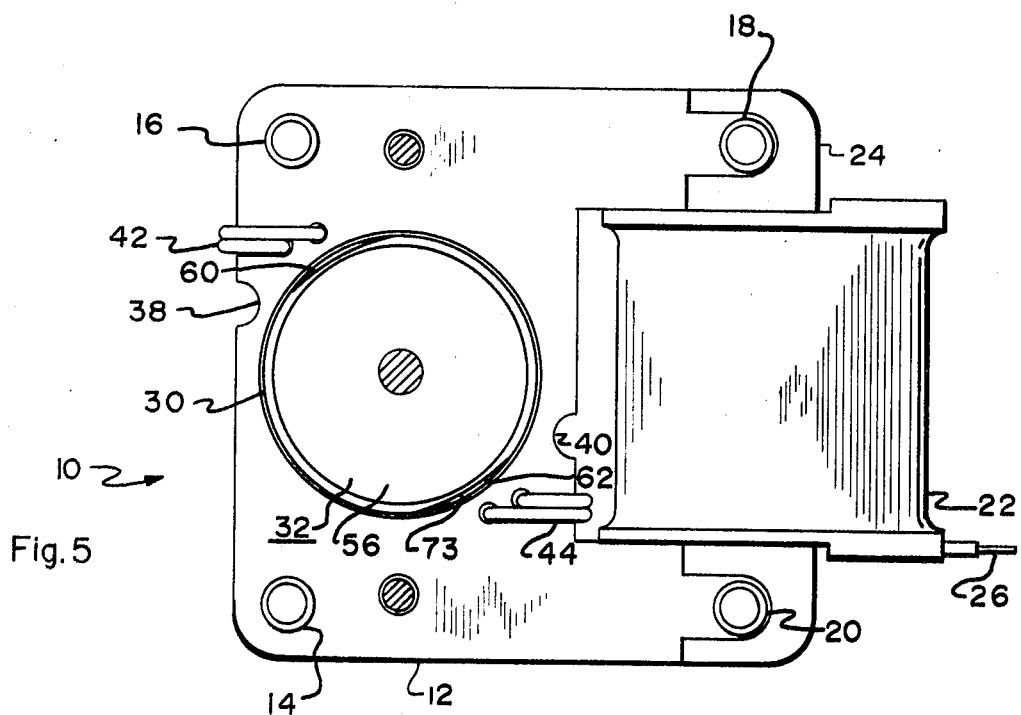
FIG. 5 is a top plan view, partially sectioned, of the motor shown in FIGS. 1–2 and helpful in understanding the present invention.

Although a position exists as shown in FIG. 5 where a large air gap occurs when the flats 60 and 62 are directly adjacent the shading coils 42 and 44, a sufficient although reduced delayed flux field passes through the rotor enabling the motor to start. Regardless of the position of the rotor assembly 32, the starting band has a fixed, constant spacing from the shading coils 42 and 44. The dimensions of the starting band are selected so that a sufficient amount of delayed flux field always passes through the rotor (even when the flats 60 and 62 are directly adjacent the shading coils) to establish a torque which will enable the motor to be self-starting.

What is claimed is:

1. A synchronous motor comprising:
a stator having a pair of poles;
means for producing a rotating single phase magnetic field between said poles;
a rotor rotatably mounted on an axis between said poles, said rotor including a plurality of washer-like members each having a plurality of annularly disposed openings;
said plurality of washer-like members disposed with corresponding openings in registration;
a squirrel-cage assembly including end members and portions extending through said washer openings, said assembly being formed of a cast conductive metal having said end members integrally formed with said portions extending through said washer openings; and
said rotor having only first and second groups of said washer-like members with the peripheral shape of each group defining a differing outer surface contour of said rotor, each of the members of said first group including arcuate peripheral portions concentric with said rotation axis interconnected by further peripheral portions in non-concentric and non-radial relation with said rotation axis, and each of the members of said second group having all peripheral portions arcuate and substantially concentric with said rotation axis to provide starting torque for said motor, and said concentric and non-concentric peripheral portions of all of said first group members being disposed with corresponding peripheral surfaces in registration.

2. A synchronous induction motor comprising:
a stator having a pair of poles and a first and second auxiliary stator winding:
a rotor rotatably mounted on an axis between said poles;
a winding wound on said stator and energized by a source of single phase alternating potential to set up a flux field in said stator which passes through said rotor and is divided into a first main flux field and a second flux field delayed by said first and second auxiliary stator windings;
said rotor including a plurality of washer-like members each having a plurality of annularly disposed openings;
said plurality of washers disposed with corresponding openings in registration;
a squirrel-cage assembly including end members and portions extending through said washer openings, said assembly being formed of a cast conductive metal having said end members integrally formed with said portions extending through said washer openings; and
said rotor having a first outer surface section providing salient poles for synchronous operation of said motor and a second outer surface section providing a starting band, said first outer surface section of said rotor including portions concentric with said rotation axis and further portions non-concentric with said rotation axis, and said second starting band section of said rotor having all portions substantially concentric with said rotation axis; said starting band being sufficiently close to said first and second auxiliary stator windings such that a sufficient amount of delay flux field passes through said rotor to provide, in combination with the main flux field, a torque which will enable the motor to be self-starting regardless of the initial position of said rotor with respect to said first and second auxiliary stator windings;

wherein said rotor first outer surface section has a greater axial length than said rotor second outer surface section.

3. A synchronous induction motor comprising:

a stator having a pair of poles and a first and second auxiliary stator winding;

a rotor rotatably mounted on a axis between said poles;

a winding wound on said stator and energized by a source of single phase alternating potential to set up a flux field in said stator which passes through said rotor and is divided into a first main flux field and a second flux field delayed by said first and second auxiliary stator windings;

said rotor including a plurality of washer-like members each having a plurality of annularly disposed openings;

said plurality of washers disposed with corresponding openings in registration;

a squirrel-cage assembly including end members and portions extending through said washer openings, said assembly being formed of a cast conductive metal having said end members integrally formed with said portions extending through said washer openings; and said rotor having a first outer surface section providing salient poles for synchronous operation of said motor and a second outer surface section providing a starting band, said first outer surface section of said rotor including portions concentric with said rotation axis and further portions non-concentric with said rotation axis, said second starting band section of said rotor having all portions substantially concentric with said rotation axis; said starting band being sufficiently close to said first and second auxiliary stator windings such that a sufficient amount of delayed flux field passes through said rotor to provide, in combination with the main flux field, a torque which will enable the motor to be self-starting regardless of the initial position of said rotor with respect to said first and second auxiliary stator windings;

wherein said rotor first outer surface section is formed of an aligned first group of washer-like members each having at least two flats, said second outer surface section comprising a circular ring formed of a second group of said washer-like members, said first and second groups being contiguous with said second group disposed adjacent one end of said rotor; and wherein a lip is formed between the flats of said first group of washer-like elements and said second cylindrical group of washer-like elements.

* * * * *